J. W. AND T. J. WHITMORE.
T. B. WHITMORE, ADMINISTRATOR OF T. J. WHITMORE, DEC'D.
PORTABLE PEANUT CLEANER AND GRADER.
APPLICATION FILED FEB. 15, 1919. RENEWED APR. 19, 1921.

1,380,449.

Patented June 7, 1921.

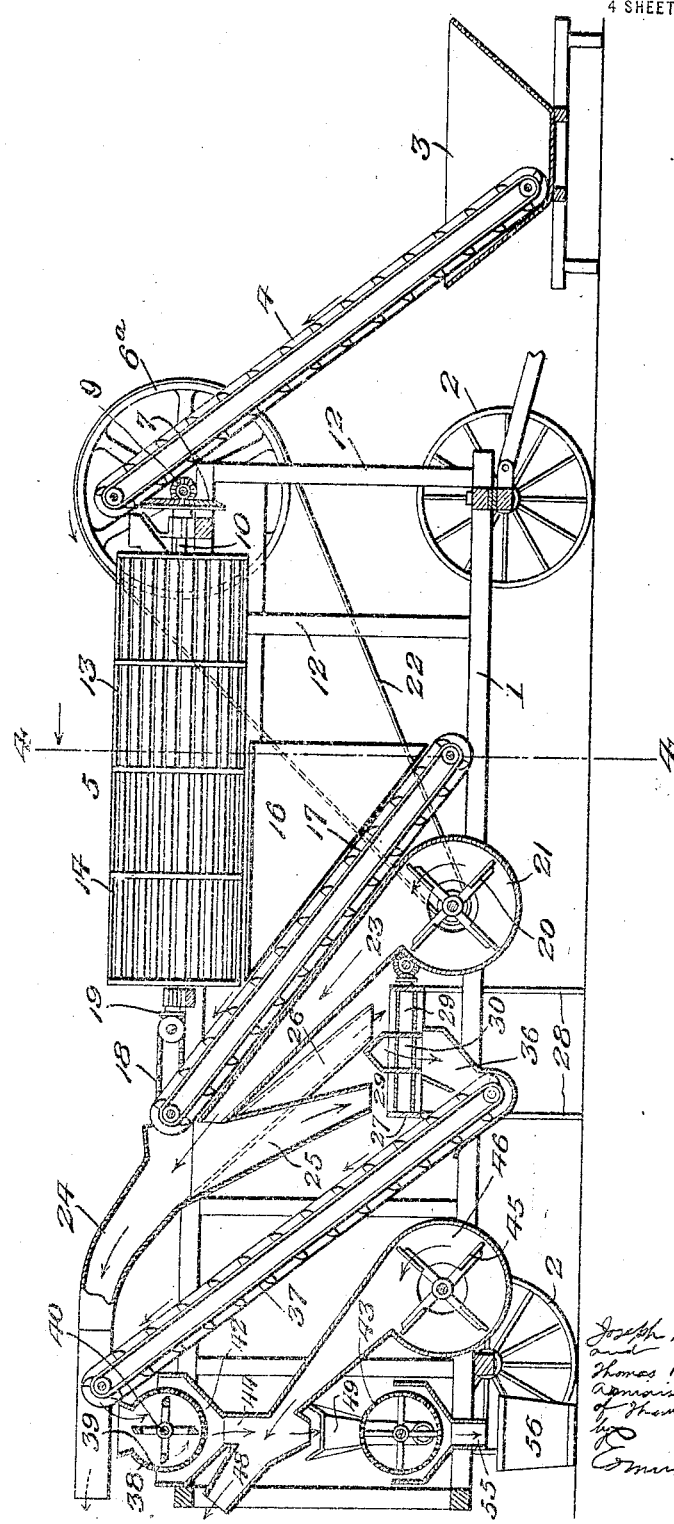

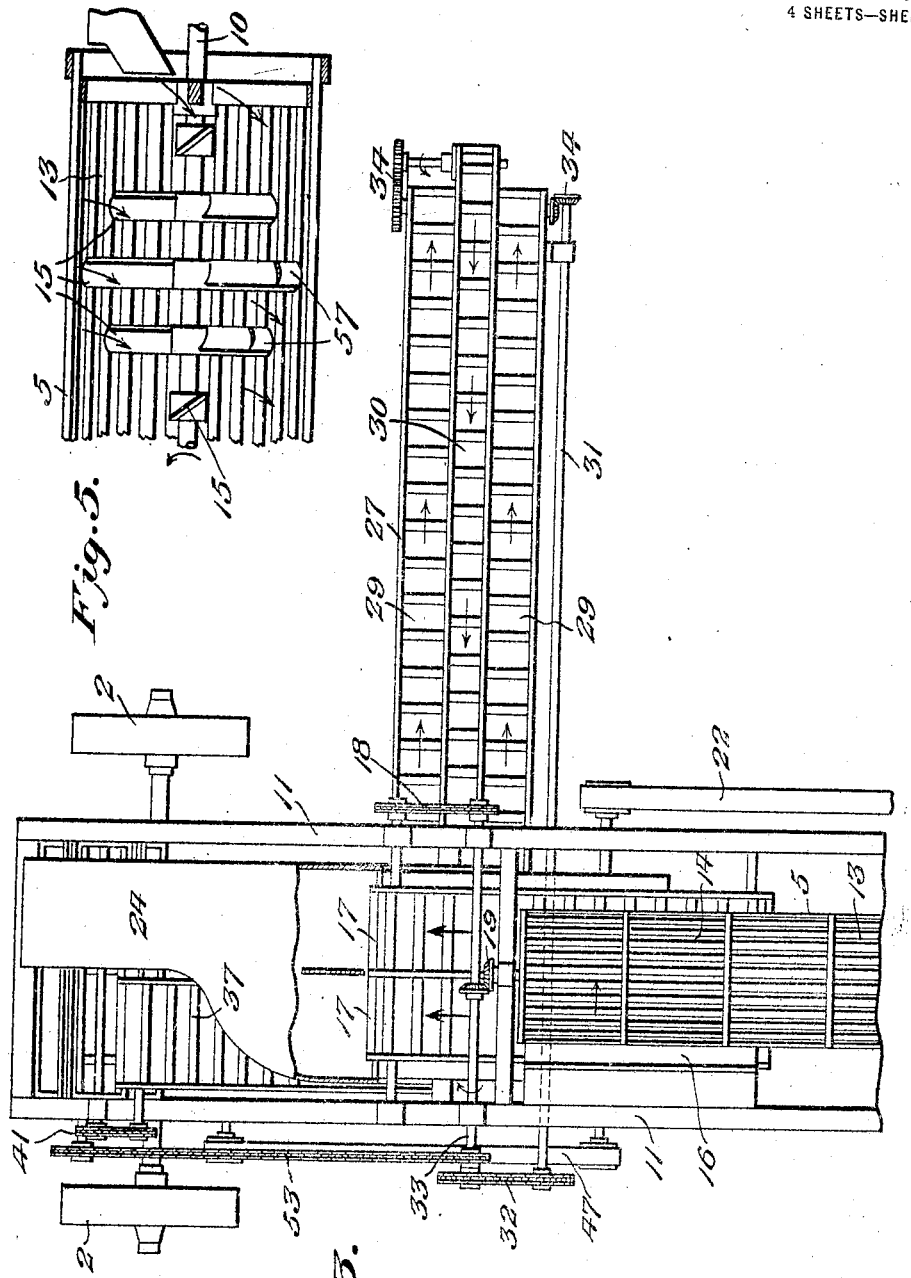

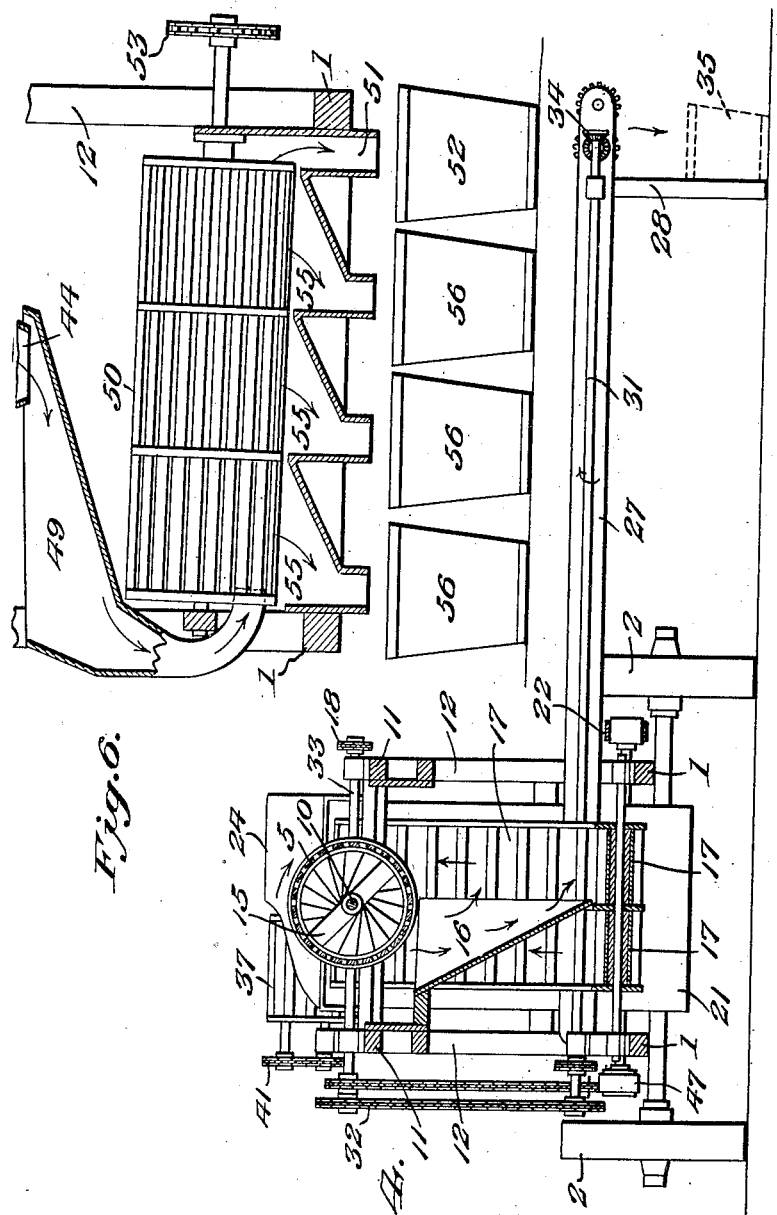

UNITED STATES PATENT OFFICE.

JOSEPH W. WHITMORE, OF DENDRON, VIRGINIA, AND THOMAS J. WHITMORE, DECEASED, LATE OF DENDRON, VIRGINIA, BY THOMAS B. WHITMORE, ADMINISTRATOR, OF DENDRON, VIRGINIA.

PORTABLE PEANUT CLEANER AND GRADER.

1,380,449. Specification of Letters Patent. Patented June 7, 1921.

Application filed February 15, 1919, Serial No. 277,376. Renewed April 19, 1921. Serial No. 462,645.

*To all whom it may concern:*

Be it known that the undersigned, JOSEPH W. WHITMORE, a citizen of the United States, and a resident of Dendron, in the county of Surry and State of Virginia, and THOMAS J. WHITMORE, deceased, whose administrator is the undersigned, THOMAS B. WHITMORE, also a citizen of the United States, and a resident of Dendon, in the county of Surry and State of Virginia, did invent certain new and useful Improvements in Portable Peanut Cleaners and Graders, of which the following is a specification, reference being had therein to the accompanying drawings.

This invention relates to a portable cleaner and grader. While its application is general, it is especially devised for use in the cleaning, assorting, grading, shelling and distributing of peanuts.

It is contemplated among the objects of the present invention to provide a device of this character which may be transported from place to place to be used directly on the ground where the peanuts or the like are gathered; in which provision is made for automatically cleaning, assorting and grading the nuts; wherein there is also provision made for hand picking; for the dividing out and elimination of foreign matter, and for finally shelling, grading and distributing the small varieties of the peas.

Heretofore it has been customary to carry peanuts a considerable distance to a factory, and as far as we are aware, we are the first to provide a portable machine of this character for the complete handling of peanuts or the like on the ground.

Still a further object of the invention is to arrange the various instrumentalities for this purpose in a neat, compact and readily accessible form whereby certain portions may be folded up compactly for transportation and readily spread out for use; which will be so arranged that the articles to be cleaned may be fed in at one end and carried continuously through the machine to the final step; and which will, in a word, provide a simple and efficient means of attaining the objects enumerated.

Other objects and advantages will in part be apparent and in part be brought out in the description which follows.

Drawings are appended illustrating a preferred embodiment of the invention, the following views being shown:

Figure 1 is a view in side elevation of a machine embodying my invention, parts being spread out and ready for use;

Fig. 2 is a similar view partly in section;

Fig. 3 is a partial view in top plan, certain portions being broken away;

Fig. 4 is a view in vertical section on the line 4—4, Fig. 2;

Fig. 5 is a fragmentary detail view of a part; and

Fig. 6 is a view in rear elevation, certain portions being in section.

Referring specifically to the drawings, the device constitutes a frame 1 mounted upon wheels 2 to be transported from place to place. Means are provided for carrying peanuts or the like from a place of storage to the machine and grading them according to size and simultaneously with the grading, polishing and removing therefrom a portion of the foreign matter. As here shown, a hopper 3 is provided for the reception of the peanuts or the like, and a conveyer 4 carries them to a combined grading and cleaning instrumentality 5. The elevator and the cylinder are suitably driven as by a pulley 6 and gearing 7, through a belt or the like 8 from a source of power, not shown. The pulley 6 is mounted on a transverse shaft 9, which carries a gear in mesh with a corresponding gear on a longitudinal shaft 10 which carries the combined grading and cleaning instrumentality 5. Both of these shafts are suitably journaled in an upper frame 11 carried on trusses or the like 12 mounted on the frame 1. The member 5 is in the nature of a screen having openings 13 of comparatively small size at the point where the peanuts enter, the openings 14 of larger dimensions toward the point where the peanuts pass out. Within this screen (see Fig. 5) and mounted on the shaft 10 there are a plurality of paddles or beaters arranged in staggered relation, and having blades 15 arranged at an angle to the axis of the cylinder. When the cylinder rotates the peanuts, dropping from the upper portion of the cylinder against the beaters will be forced in the direction of the arrows in Fig. 5 and toward the exit end of the cylinder. Beneath a portion of the cylinder there is arranged a distributer 16 for the reception of the impurities and smaller grade of nuts, and from the cylinder the residue passes to a pair of conveyers 17 arranged side by side beneath the cylinder. These slope upwardly, their lower portions being mounted upon the frame 1 and the upper portions being in approximate alinement with the axis of the cylinder. These conveyers are driven suitably, as by a chain and sprocket 18 driven from a gear 19 mounted on the cylinder shaft 10. In dropping the peas from the cylinder to the conveyers, they are agitated and spread out so that any foreign substances therein may be readily removed.

Means are provided for removing any foreign matter from the materials, and as here shown, such means comprise a fan 20 suitably mounted in a casing 21 and driven by a belt or the like 22 from a pulley 6ª. The casing has a funnel 23 with a restricted outer portion to direct a blast beneath the point where the peas are dropped from the conveyers 17. The blast thus created carries the lighter particles of foreign matter through a chute 24 toward the end of the machine where they may be conveyed by any suitable means to a place of storage. The lower portion of this chute 24 is bifurcated and has depending portions 25 and 26 which direct the peas to a hand-picking attachment comprising an extension 27 mounted on the frame 1 and provided at its outer extremity with a support 28. This frame carries oppositely disposed conveyer belts or the like 29 which carry the peas from the body of the machine outwardly to be picked in transit by hand pickers, the foreign substances being deposited on a centrally-disposed belt 30. These belts are driven suitably as by a shaft 31 driven as by a chain-and-sprocket drive 32 from a cross-shaft 33 geared to the axle 10 of the cylinder 5. The outer extremity of the shaft 31 drives gearing 34 arranged to drive the outer belts 29 in one direction and the belt 30 in the opposite direction. From the outer extremity of the belts the picked peas may be collected in a suitable receptacle 35 while the smaller portions are carried back by belt 30 to a chute 36 in communication with a second conveyer 37. This is also arranged at an angle to the frames, the lower portion being disposed on the frame 1 and the upper portion in communication with a sheller 38. This latter comprises an open grating 39 in which there is mounted for rotation a plurality of beaters disposed on a shaft 40 suitably driven as by a chain-and-sprocket 41 attached to one of the shafts which support the elevator 37. The shells and nuts are collected in a hopper 42, whence they are carried to a grader 43 through a chute 44 in which there is arranged a cross-blast apparatus comprising a fan 45 disposed in a casing 46 and suitably driven as by a belt 47 driven from the shaft of the fan 20. The outer end of this casing is restricted to constitute a nozzle whereby a cross-draft will meet the shells and lighter particles as they drop from the sheller to the grader, the impurities being carried out through the chute 48. A portion of this chute is in communication as by a nozzle 49 with the interior of the grader, which in the present instance comprises a cylindrical screen having openings of comparatively small dimension at the point where the peas enter the screen and increasing in dimension toward the opposite extremity where the residue is finally carried through a chute 51 into a storage receptacle or the like 52. The screen is suitably driven as by a chain-and-sprocket gearing 53 connected with the cross-shaft 54 which is in turn driven suitably as from the main cylinder shaft 10. Beneath the different sections of this screen 50 there are hoppers 55 adapted to convey the graded nuts to receptacles 56.

When it is desired to polish the nuts, the beaters 15 may be provided with a facing 57 of some polishing material, and in practice it has been found that leather, felt, or the like produces the desired results.

From the foregoing, it will be apparent that the present invention provides a means of grading, cleaning, shelling, and assorting articles, such as nuts and particularly peanuts, polishing the shells during their transit from one end of the machine to the other, permitting hand picking thereof, and in a word, forms a unitary, compact structure which may be transported from place to place to effect these results. The extended sections of the machine are foldable back upon the body thereof when not in use, and while the invention has been disclosed in the embodiment herein shown, it will be understood that it is not to be limited to the precise form of this disclosure, as many changes may be made in the general construction and arrangement of the parts without departing from the spirit of the invention or its scope as set forth in the claims.

What we claim is:

1. A combined peanut grader and cleaner including a source of power; a grading and polishing cylinder driven from said source of power; mechanism for subjecting the materials to a blast associated with said cylinder; a separating instrumentality for apportioning materials so subjected to the blast; a hand-picker belt associated with the separating instrumentality and adapted to receive materials therefrom; means for conveying materials selected from the picker belt; a grading and shelling instrumentality associated with the conveyer; and mechanism for subjecting the materials to a blast associated with the grading and shelling instrumentality; the conveyers, picker belt, cylinder, blast-producing, grading and shelling instrumentalities all being in driving connection with the source of power.

2. A combined peanut grader and cleaner including a source of power; a shaft driven from said source of power; a combined grading and polishing cylinder mounted on said shaft and adapted to rotate therewith; a plurality of polishing beaters mounted upon said shaft within the cylinder; a conveyer adapted to carry materials to said cylinder, and driven from said source of power; an inclined conveyer disposed beneath the cylinder and adapted to receive materials passing therefrom; a blast producing instrumentality driven from the source of power and adapted to subject the materials to a blast as they pass from said conveyer; a separating instrumentality adapted to apportion materials after they have passed from the conveyer and are subjected to the blast; a hand picker belt adapted to receive a part of the materials thus apportioned; an instrumentality for returning materials selected from the hand picker belt; a conveyer associated with said instrumentality; a shelling instrumentality associated with the conveyer and adapted to receive materials therefrom; a blast producing instrumentality associated with the shelling instrumentality; a grading and assorting instrumentality associated with the sheller and adapted to receive materials therefrom; said cylinder, conveyers, blast-producing, shelling, grading and assorting instrumentalities, hand picker and return belt all being in driving connection with a source of power.

In testimony whereof, we have hereunto affixed our signatures.

JOSEPH W. WHITMORE.
THOMAS B. WHITMORE.
*Administrator of the estate of Thomas J. Whitmore, deceased.*